United States Patent [19]

Skala

[11] 4,173,993
[45] Nov. 13, 1979

[54] DOMESTIC APPLIANCE SYSTEM WITH THERMAL EXCHANGE FLUID

[76] Inventor: Stephen F. Skala, 3839 S. Wenonah Ave., Berwyn, Ill. 60402

[21] Appl. No.: 839,618

[22] Filed: Oct. 5, 1977

Related U.S. Application Data

[63] Continuation-in-part of Ser. No. 299,274, Oct. 4, 1972, Pat. No. 3,888,303, and a continuation-in-part of Ser. No. 567,647, Apr. 14, 1975, abandoned.

[51] Int. Cl.² ............................................. F25B 29/00
[52] U.S. Cl. ..................................... 165/48 R; 62/185; 126/400; 165/104 S
[58] Field of Search .................. 165/104 S, 48, 2; 126/400; 62/185

[56] References Cited

U.S. PATENT DOCUMENTS

| | | | |
|---|---|---|---|
| 2,052,014 | 8/1936 | Chamberlain | 165/104 S X |
| 3,237,415 | 3/1966 | Newton | 62/185 X |
| 3,888,303 | 6/1975 | Skala | 165/2 |
| 4,009,368 | 2/1977 | Faivre et al. | 165/104 S X |

*Primary Examiner*—Albert W. Davis, Jr.
*Assistant Examiner*—Margaret A. Focarino

[57] ABSTRACT

A domestic appliance system and method are provided for storing and processing food by exchanging heat between the food and a latent heat storing material by forced circulation of a liquid thermal exchange fluid. A plurality of appliances, each having a single heat exchanger for receiving the thermal exchange fluid, connect across supply and return mains which contain the thermal exchange fluid at a differential pressure. Hot supply and return mains are part of a liquid thermal exchange fluid circuit which also includes a heat exchanger for exchanging heat with latent heat storing material in a hot reservoir, a pump, and the appliance heat exchangers with selector and regulator valves to control flow and temperature of thermal exchange fluid within the appliances. Cold supply and return mains are part of a similar liquid thermal exchange fluid circuit for exchanging heat between a cold latent heat storing material and a plurality of appliances. Moderate temperature supply and return mains are part of another similar circuit for exchanging heat in auxiliary heat sinks to deliver the thermal exchange fluid at moderate temperatures to a plurality of appliances during temperature transitions between hot and cold to conserve energy.

As the thermal exchange fluid is forced to circulate between selected appliances and independently selected thermal reservoirs or auxiliary heat sinks, food associated with the appliances is subject to programmed temperatures. The thermal reservoirs are charged at off-peak hours and have large thermal capacity and peak thermal delivery capability.

7 Claims, 3 Drawing Figures

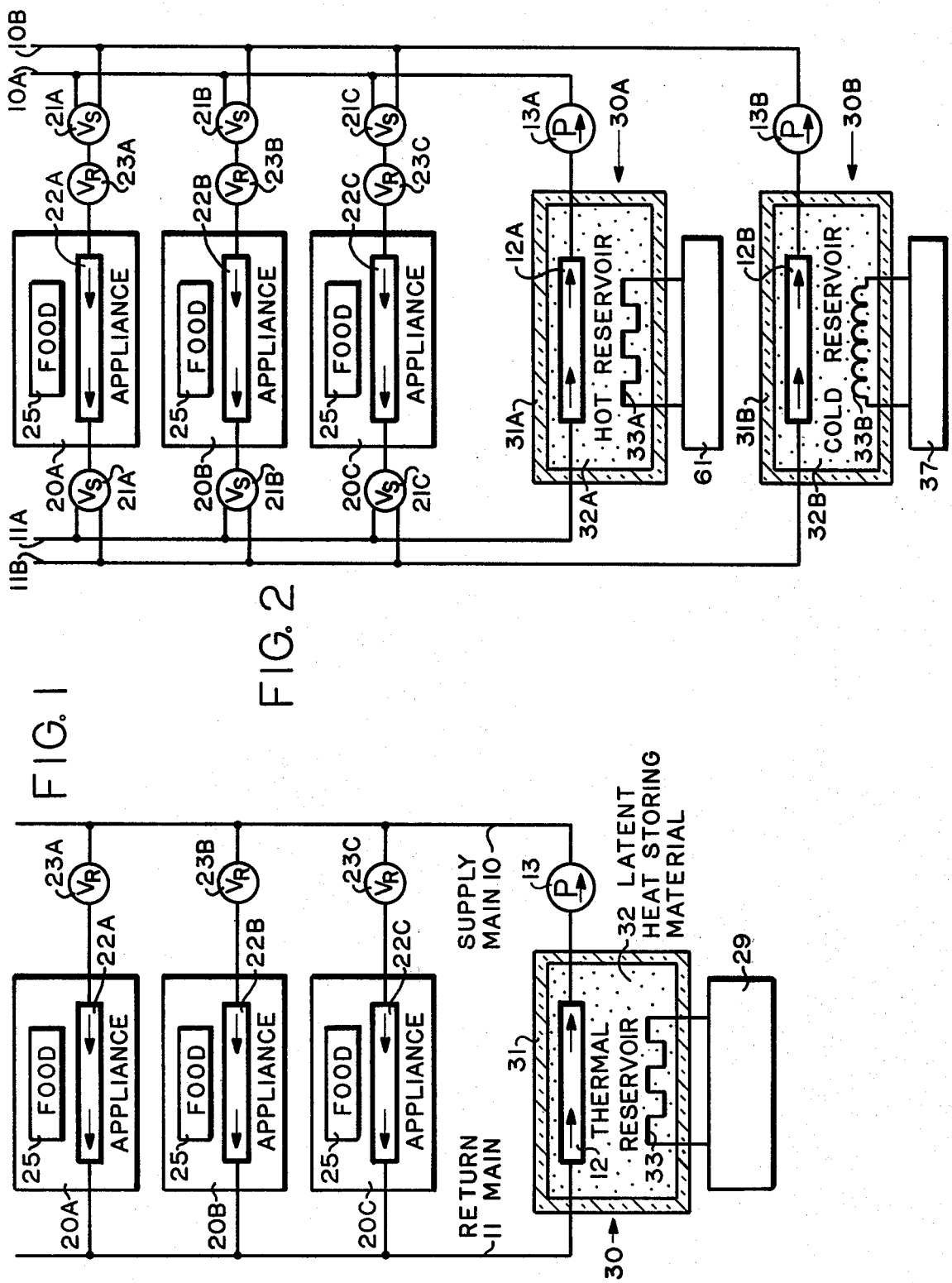

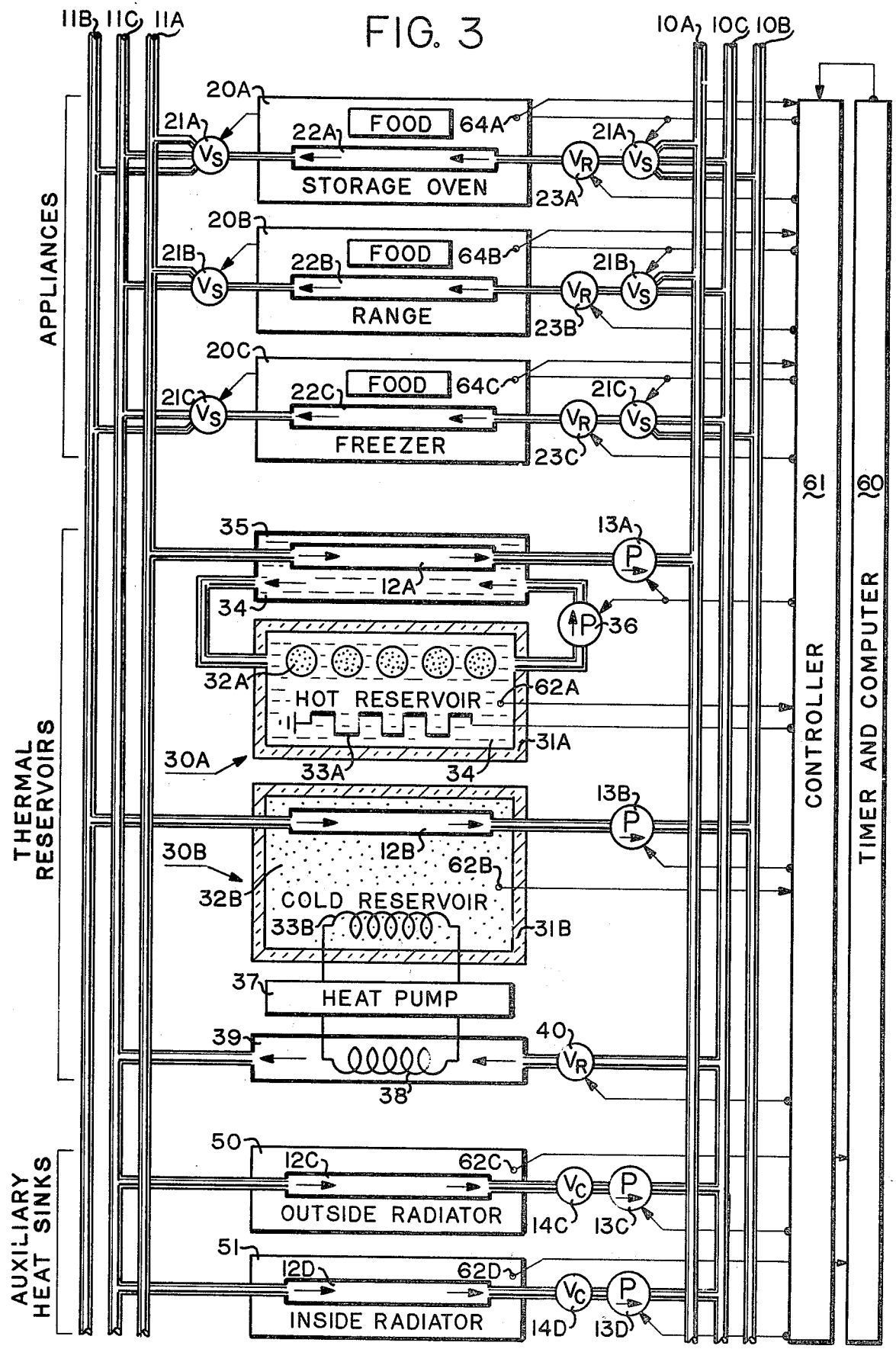

DOMESTIC APPLIANCE SYSTEM WITH THERMAL EXCHANGE FLUID

The present application is a continuation-in-part of application Ser. No. 299,274 filed Oct. 4, 1972 now U.S. Pat. No. 3,888,303 and is now a continuation-in-part of application Ser. No. 567,647 filed Apr. 14, 1975 now abandoned.

CROSS-REFERENCES TO RELATED APPLICATIONS

Ser. No. 756,392 entitled Hot Reservoir System For Intermittent Users.
Ser. No. 941,123 entitled Pressure Cooking Appliance With Thermal Exchange Fluid.
Ser. No. 792,455 entitled Oven With Refrigerated Food Storage Based On Thermal Exchange Fluid.
Ser. No. 908,509 entitled Freezer with Rapid Defrosting.

BACKGROUND OF THE INVENTION

This invention relates to a method and apparatus for domestic processing of food and more particularly it relates to such food processing by exchange of heat between latent heat storing materials and the food by forced circulation of a liquid thermal exchange fluid.

Although thermal exchange fluid systems are known in various industrial and commercial applications, such prior art does not include hot and cold reservoirs having latent heat storing materials which are used to advantage in the system of the invention. Liquid thermal exchange fluid systems generally comprise a thermal source, a user, and a circuit to circulate the thermal exchange fluid between them. Various prior systems indicate components and configurations which may be adapted to satisfy particular applications.

A representative industrial heating system for such applications as processing materials in chemical reactors or kettles circulates a stable organic liquid between a furnace and a jacket surrounding the processing vessel. The liquid circuit includes a pump to provide a more rapid flow and effective heat transfer across heat exchange surfaces and includes a regulator valve to control temperature of thermal exchange fluid at the jacket of the processing vessel. Some industrial processes, such as molding of thermoplastic materials, require alternate heating and cooling of molding dies. A cold liquid circuit, similar to the hot liquid circuit and also comprising a pump, conduits, and a heat exchanger in thermal contact with a cooling means such as cold water, delivers cool thermal exchange fluid to a selector valve which selects flow from the hot or the cold circuit for delivery through the molding die. With relatively short duration of the heating and cooling phases and continuous operation of the process, thermal storage by a sensible mode in the thermal exchange fluid is adequate and thermal capacity of heaters or other sources is approximately that of current user requirements. Although some domestic processes could benefit from the more precise temperature control and alternate heating and cooling capability provided by some of the industrial thermal exchange fluid systems, their generally intermittent use, wide range of heating and cooling demand, and a requirement of moderate initial and operating cost with performance significantly improved over conventional domestic heating and cooling means precludes use of the kinds of thermal exchange fluid systems which could be suggested by industrial thermal exchange fluid systems.

Latent heat storing systems with fluid heat transfer are used for domestic space or water heating where they provide charging of the storing system at more convenient times or under more economical conditions. A typical space heating system has a single liquid circuit which can be connected to hot and cold sources through a selector valve. Such systems do not provide the combination of hot and cold reservoirs with latent heat storage and a hot and a cold liquid circuit each connectable to a user.

Commercial systems based on thermal exchange fluids for processing foods at alternate high and low temperatures typically use either a vapor phase fluid, such as steam, for heating and its liquid phase for cooling or they use two different substances, such as steam and a refrigerant, in separate heat exchangers for heating and cooling. Separate fluids or heat exchangers would be undersirably complex for domestic appliance systems.

A domestic appliance system disclosed by A. N. A. Axlander in U.S. Pat. No. 3,543,001 uses a liquid thermal exchange fluid to accumulate heat in a hot reservoir and to transfer the heat by natural convection through appliance units such as ovens or stove plates. Although the system provides precise temperature control and charging of the hot reservoir at off-peak hours, it has disadvantages of heat storage in a sensible rather than latent mode which results in large temperature variation and size of the hot reservoir, natural rather than forced convection which limits heat transfer rate to the appliances, separate mains for each appliance which results in a complex conduit assembly, and lack of cooling capability which limits general use for a domestic appliance system.

Another domestic appliance system based on liquid thermal exchange fluid disclosed in my U.S. Pat. No. 3,888,303 has a thermal exchange fluid circulating between hot or cold reservoirs and connectable household units. Although forced circulation and heating and cooling capability are provided, the system lacks thermal storage in a latent mode, and a separate liquid circuit is used to deliver the thermal exchange fluid to each houseware unit. A general disadvantage is that special houseware units are required.

Conventional domestic appliances such as refrigerators, ovens, and ranges which are used for storage or processing of food are generally self-contained units and are not part of a system for storing and distributing thermal energy to optimize energy inputs, processing conditions, disposition of unwanted heat, and distribution of cost between assemblies for converting energy and for delivering the energy to food. Deficiencies of conventional appliances will become more apparent as they are compared to the system and method of the invention and include:

Transfer of waste heat into the kitchen where it may have to be removed by an air conditioner with further energy expenditure. Sources of such waste heat include residual appliance heat remaining after cooking has been completed and refrigerant condensation heat.

Since conventional appliances are self-contained, marginal cost of additional units does not decline. Accordingly, the number of specialized appliances which could increase the range of food processing environments is limited by cost. Further, combining heating and cooling functions in a single appliance is expensive by conventional means and would not be feasible for a large number of appliances. Yet combined heating and cooling capability has advantages for improving food values and for increasing conveniences such as unattended cooking. Proposed conventional conveyor means for transferring food from a refrigerator to an oven are excessively complex and limited.

Since energy is not stored in conventional appliances, inputs are scaled to present demand which results in costly power supply apparatus and use of expensive power during peak hours. Further, heat content and transfer in conventional ovens or ranges at high temperature and low velocity convection are seldom optimal. Substances of low viscosity, such as water for soups, coffee, or other processing, typically are not heated rapidly. Substances of high viscosity or solids, however, may be scorched at high temperature. A system capable of providing larger heat capacity and controlled temperatures would be desireable.

OBJECTS OF THE INVENTION

It is a general object of the invention to provide an improved domestic appliance system and method for storing and processing food.

It is another object to provide a system of common assemblies for delivering heat and cold to which can be connected a substantial plurality of diverse economical appliances.

It is yet another object to reduce energy cost by charging thermal reservoirs at off-peak hours and by distributing waste heat to appropriate auxiliary heat sinks.

It is still another object to provide for domestic appliance use the general advantages of latent thermal storage and of heat transfer by forced circulation of liquid thermal exchange fluid.

SUMMARY

These and other objects and advantages which will become apparent are attained by the invention wherein heat is exchanged between food materials in a plurality of domestic appliances and latent heat storing material in a thermal reservoir by forced circulation of a liquid thermal exchange fluid.

An elementary embodiment of the invention uses a single liquid thermal exchange fluid circuit comprising heat exchangers in a plurality of appliances connected to a supply and a return main which are joined by a pump in series with a source heat exchanger in a thermal reservoir containing latent heat storing material.

A basic embodiment of the invention uses two such liquid thermal exchange fluid circuits, one for the thermal exchange fluid at a hot temperature and the other for the thermal exchange fluid at a cold temperature to exchange heat between latent heat storing materials and the food materials in a plurality of appliances. Each appliance has a single heat exchanger and a single thermal exchange fluid circulates in both circuits.

A preferred embodiment of the invention uses a plurality of liquid thermal exchange fluid circuits including the hot and cold circuits wherein heat is exchanged with the latent heat storing materials and additionally includes a circuit which exchanges heat with ambient thermal masses to moderate appliance temperature during transitions between hot and cold. A plurality of appliances connects to the circuits through selector valves and regulator valves to allow heat exchange between food materials and thermal exchange fluid at temperatures ranging between those of the hot and the cold reservoirs. Each appliance has a single heat exchanger and the appliance system uses a single liquid thermal exchanger fluid for forced circulation through all of the circuits.

The elementary embodiment illustrates advantages of cooling or heating food materials in a system which exchanges heat by forced circulation of a thermal exchange fluid between a latent heat storing material and the food materials in a plurality of appliances.

A system comprising common assemblies such as the thermal reservoir, pump, and supply and return mains with a plurality of appliance units results in a desirable distribution of costs when compared to conventional appliances. The common assemblies can be more complex when necessary for improved performance and efficiency since their cost is shared by all of the appliances, yet the appliance units are more simple and a larger number of more specialized appliances can be provided economically.

Forced circulation of a liquid thermal exchange fluid at a reasonable velocity across heat exchange surfaces provides effective heat transfer while blending thermal exchange fluid at lower velocity into an appliance heat exchanger provides a basis for precise temperature control. Use of a low pressure liquid thermal exchange fluid system provides greater safety and economy than would be possible with a vapor phase system.

Thermal storage generally allows charging of thermal reservoirs at off-peak hours for reduced energy cost, and extended charging time at relatively small power levels for reduced cost of power sources and controls, and a large peak thermal capacity for rapid exchange of heat with food materials. Thermal storage in a latent rather than a sensible mode allows thermal reservoirs to operate in a narrow temperature range to reduce excess heat loss at extreme temperature excursions, to reduce deterioration of thermally sensitive materials at high temperature, and to allow more compact thermal reservoirs. Use of a separate substance for storing heat allows better selection of properties relating to heat storage such as large heat capacity, suitable phase transition temperature, and low cost. Use of a separate substance for exchanging heat allows use of smaller quantities of more expensive synthetic thermal exchange fluids with better selection of properties relating to heat exchange.

The basic embodiment retains the advantages of the elementary embodiment and provides further advantages of combined heating and cooling for the same appliance. One advantage of such heating and cooling is that food can be stored at low temperature for later automatic processing. Another advantage is that a freezer can be rapidly defrosted by a momentary flow of warm thermal exchange fluid. Yet another advantage is that food values can be improved under conditions which include rapid cooling after cooking.

The preferred embodiment retains the advantages of the elementary and the basic embodiments while the auxiliary heat sinks provide the further advantage of reducing discharge of thermal reservoirs during transitions between hot and cold by first moderating appliance temperature. Accordingly, a cold reservoir normally will not receive flow of hot thermal exchange fluid. Another advantage of an auxiliary heat sink circuit is that unwanted heat can be transferred to thermal masses in more optimal environments. As an example, in hot weather, waste heat from an appliance or from a heat pump compression coil is transferred to outside air to reduce discomfort and to reduce energy use by reducing air conditioning load. In cold weather, however, the waste heat is transferred to inside air to supplement space heating.

A general advantage of the system of the invention is that common assemblies provide thermal exchange fluid with large heat transfer capability in a wide range of temperatures with computer controlled power sources to provide programs of temperature and other food processing variables as a function of time for use by various kinds of appliance units. Having such common assemblies, novel appliances can evolve to improve convenience or to increase options for cooking environments to improve food values beyond those of conventional appliances.

An example of such a novel appliance which increases options for cooking environments is provided by cited copending application Ser. No. 941,123 relating to pressure cooking. The appliance has a heat exchanger, described as an enclosed chamber for receiving thermal exchange fluid, and can heat or cool contained food materials. Heat exchange with the contained food is enhanced by such means as vapor condensation or evaporation and forced convection. In a cooking method disclosed by J. O. Hice in U.S. Pat. No. 3,672,908, control of pressure and temperature independently and control of temperature transition rate was shown to improve food values such as moisture content and texture. The novel pressure appliance connected to the common assemblies of the invention provides such food processing conditions with relatively simple apparatus. Another example of such a novel appliance connected to the common assemblies is provided by my U.S. Pat. No. 4,024,904 relating to a forced air range which has a heat exchanger for receiving thermal exchange fluid. Temperature and velocity of air circulating between the heat exchanger and a food container are independently controllable to provide a choice among such food processing conditions as rapid heat transfer at high temperature and velocity or a sequence of precisely controlled temperature levels.

In addition to such novel appliances, appliances based on thermal exchange fluid but having more conventional functions can be located more conveniently as the following examples indicate. Water or beverage chillers or heaters are located at a kitchen sink or in dining areas. Cold storage at precisely controlled temperatures is provided for such items as fruit or wine at locations remote from kitchen work areas. Appliances for holding food at serving temperatures are located in dining areas.

Yet other appliances based on thermal exchange fluid substitute the heat source from common assemblies for those of conventional appliances such as smooth top ranges or grills.

For an understanding of the principles of the invention, reference is made to typical embodiments illustrated in the following drawings and description.

DESCRIPTION OF THE DRAWINGS

FIG. 1 is a highly diagrammatic view of an elementary form of apparatus embodying the invention.

FIG. 2 is a highly diagrammatic view of a basic form of apparatus embodying the invention.

FIG. 3 is a diagrammatic view of a preferred form of apparatus embodying the invention.

As shown in FIG. 1, heat is exchanged between a latent heat storing material in a thermal reservoir and food materials in a plurality of appliances by forced circulation of a thermal exchange fluid. This system may be used either for heating or for cooling.

A liquid thermal exchange fluid circuit comprises supply main 10 and return main 11 connected by source heat exchanger 12 and pump 13. A plurality of appliance heat exchangers 22A, 22B, and 22C are connected across the supply and return mains through regulator valves 23A, 23B, and 23C to complete the circuit. Pump 13 develops a pressure differential across the supply and return mains. When a regulator valve such as 23A opens, thermal exchange fluid is forced to circulate between appliance heat exchanger 22A and source heat exchanger 12.

Thermal reservoir 30 comprises an insulated vessel 31 surrounding latent heat storing material 32 in which is embedded a thermal reservoir charging means 33 which is connected to charging supply 29. The thermal reservoir charging means and its charging supply release heat to or absorb heat from the latent heat storing material to effect a phase transition to store heat at the phase transition temperature. In most cases, the phase transition is crystallization or fusion. The thermal reservoir has sufficient capacity for periods of peak use, such as the time to prepare a meal, and preferably has sufficient capacity for normal daily use to allow charging of the thermal reservoir at off-peak hours. Since charging time is generally much longer than peak use periods for domestic appliances, the thermal reservoir charging means and its charging supply is correspondingly small to reduce apparatus cost.

A plurality of appliances 20A, 20B, and 20C are associated with corresponding appliance heat exchangers 22A, 22B, and 22C respectively and function to mediate exchange of heat between food materials 25 and the appliance heat exchangers. The exchange of heat may occur through such means as forced or natural air convection, conduction, or vapor condensation or evaporation. The appliance heat exchangers are of various forms appropriate for particular appliances and may be characterized, for example, as double jackets, enclosed chambers, or finned radiators. To reduce temperature variation across heat exchange surfaces, thermal exchange fluid flow paths are designed so that adjacent paths have the same average temperature as the average of incoming and outgoing thermal exchange fluid. Although extreme temperature regulation is seldom required in domestic appliances, it can be provided by known methods for recirculating thermal exchange fluid through a heat exchanger to blend portions of fluid which may have been at different temperatures. Flow velocity of the thermal exchange fluid is regulated by the pump and regulator valve to attain desired temperature conditions. As examples, flow may be rapid at the start of a cooking phase for rapid temperature rise in the appliance or flow may be regulated to maintain a selected temperature at the appliance heat exchanger surface.

In FIG. 2, food materials in a plurality of appliances exchange heat with latent heat storing materials in hot and cold reservoirs by forced circulation of thermal exchange fluid. Each appliance has a single heat exchanger and the system uses a single thermal exchange fluid which remains a liquid at thermal reservoir temperatures.

A hot liquid thermal exchange fluid circuit comprises hot supply main 10A and hot return main 11A joined by source heat exchanger 12A and pump 13A which develops a differential pressure between the supply and return mains. Similarly, a cold liquid thermal exchange fluid circuit comprises cold supply main 10B and a cold return main 11B joined by source heat exchanger 12B and pump 13B. Each appliance 20A, 20B, and 20C has a single heat exchanger 22A, 22B, and 22C respectively which joins the hot and cold supply and return mains through regulator valves 23A, 23B, and 23C and selector valves 21A, 21B, and 21C. Each appliance independently selects circulation of thermal exchange fluid through the hot circuit or the cold circuit.

Hot reservoir 30A comprises an insulated vessel 31A surrounding hot latent heat storing material 32A, a heater 33A, and a controller 61. At off-peak hours, the hot reservoir is charged by the heater melting the hot latent heat storing material. As thermal exchange fluid flow through source heat exchanger 12A to absorb heat, the latent heat storing material crystallizes to release latent heat. Similarly, cold reservoir 30B comprises an insulated vessel 31B surrounding cold latent heat storing material 23B, a refrigerant expansion coil 33B, and heat pump 37. At off-peak hours, the cold reservoir is charged by the refrigerant expansion coil freezing the latent heat storing material. As thermal exchange fluid flows through source heat exchanger 12B to release heat, the latent heat storing material melts to absorb latent heat.

FIG. 3 shows the preferred embodiment in more detail with auxiliary heat sinks for moderating appliance temperature and means for controlling flow of thermal exchange fluid according to a program.

A hot liquid thermal exchange fluid circuit comprises hot supply main 10A and hot return main 10B joined by hot reservoir source heat exchanger 12A and pump 13A. Similarly, a cold liquid thermal exchange fluid circuit comprises cold supply main 10B and cold return main 11B joined by cold reservoir source heat exchanger 12B and pump 13B. A moderate temperature liquid thermal exchange fluid circuit comprises supply main 10C and return main 11C joined by source heat exchanger 12C, pump 13C, and check valve 14C. The supply and return mains are also joined in parallel by source heat exchanger 12D, pump 13D, and check valve 14D. Only one of the pumps 13C or 13D operates at one time and the check valves prevent reverse flow through nonoperating source heat exchangers. An alternative structure for joining source heat exchangers 12C and 12D to the supply and return mains, not shown comprises a single pump connected on one side to the supply main and connected on the other side to regulator valves in series with the source heat exchangers. Each of the pumps is operated by an electric motor, not shown, to develop a pressure differential between the supply and return mains.

The liquid thermal exchange fluid circuits are completed by appliances connecting to the supply and return mains to allow circulation of the thermal exchange fluid. Storage over 20A is representative of appliances connectable to hot, cold, and moderate temperature supply and return mains. Selector valves 21A are operated in parallel to join corresponding supply and return mains through appliance heat exchanger 22A and regulator valve 23A. Range 20B is representative of appliances connectable to supply and return mains at hot and at moderate temperatures. Selector valves 21B connect either to the hot supply and return mains or to the moderate temperature supply and return mains. When regulator valve 23B is open, thermal exchange fluid flows through appliance heat exchanger 22B. Freezer 20C is representative of appliances connectable to supply and return mains at cold and moderate temperatures through selector valves 21C, appliance heat exchanger 22C, and regulator valve 23C.

The appliances are selectively connectable to thermal reservoirs and auxiliary heat sinks, collectively designated thermal sources, to form various combinations of circuits which can operate simultaneously. As an example, thermal exchange fluid may be forced to circulate between appliance heat exchangers 22A and 22B and source heat exchanger 12A in response to pressure developed by pump 13A. At the same time, thermal exchange fluid may be forced to circulate between appliance heat exchanger 22C and source heat exchanger 12B in response to pressure developed by pump 13B. At another time, thermal exchange fluid may be forced to circulate between appliance heat exchangers 22A, 22B, and 22C and source heat exchanger 13C.

Thermal reservoirs store heat as latent heat of phase transition and exchange the stored heat with thermal exchange fluid for further heat exchanger with food associated with domestic appliances. A preferred hot reservoir is described in more detail in cited copending application Ser. No. 756,392 where an intermediate heat exchange loop is used to reduce thermal deterioration of the organic thermal exchange fluid during idle periods. Briefly, a hot reservoir 30A comprises an insulated vessel 31A surrounding encapsulated latent heat storing material 32A and heater 33A immersed in a thermally stable heat exchange fluid 34. Latent heat storing material encapsulation is designed for low thermal impedence by such means as short conductive path or metal penetrations to provide rapid heat transfer during peak demand. An intermediate heat exchange loop comprising a secondary heat exchanger 35 and pump 36 transfers heat from the latent heat storing material to the thermal exchange fluid by circulating the heat exchange fluid 34. Pumps 13A and 36 are operated simultaneously upon demand from one or more appliances so that heat is transferred from the hot reservoir only when the thermal exchange fluid is flowing through source heat exchanger 12A. A preferred heat exchange fluid for the intermediate heat exchange loop is a sodium-potassium alloy, pump 36 is preferably of the electromagnetic type, and the latent heat storing material for the hot reservoir is preferably a mixture of sodium and potassium hydroxides in proportions having a melting point of about 550° F.

Cold reservoir 30B comprises an insulated vessel 31B surrounding cold latent heat storing material 32B in which is placed source heat exchanger 12B and refrigerant expansion coil 33B. A heat pump 37 connects to the refrigerant expansion coil and to refrigerant compression coil 38 which is immersed in thermal exchange fluid within heat exchanger 39 which connects to supply main 10C and return main 11C through regulator valve 40. When the heat pump operates to charge the cold reservoir, heat is absorbed by the expanding refrigerant from heat storing material 32B which freezes while heat is released by the compressed refrigerant to thermal exchanger fluid flowing through heat exchanger 39 and open regulator valve 40. The cold reservoir is a more simple structure than the hot reservoir since source heat exchanger 12B is positioned within the cold reservoir since thermal exchange fluid does not deteriorate at low temperature, and encapsulated structures for cold latent heat storing material are not usually necessary since demand for cooling tends to be more uniform reducing need for peak heat transfer methods. Further, a typical phase transition is melting which contributes convective heat transfer. The cold latent heat storing material is preferably water with its freezing point depressed to about −20° F. by such substances as ethylene glycol or ethanol.

Auxiliary heat sinks moderate thermal exchange fluid temperature to that of selected thermal masses. Their principal function for the invention is to reduce discharge of thermal reservoirs during appliance transitions between hot and cold. While serving such a function, unwanted thermal exchange fluid heat may be used for space heating in appropriate weather or for other applications. One auxiliary heat sink is outside radiator 50 which is in thermal contact with outside air. Source heat exchanger 12C is a radiator structure located on an outer portion of a house and is normally used to discharge heat in warm weather. Another auxiliary heat sink is inside radiator 51 which is in thermal contact with air within a house. Source radiator 12D has a radiator structure and is normally used in cold weather for supplementary space heating. Another auxiliary heat sink, not shown, can be used to preheat water for water heaters.

Operation of the appliance system is predetermined by operating assemblies such as pumps, valves, and thermal inputs functioning in response to programs. A timer and computer 60 generates temperature and other set-point information to specify internal appliance environments for food storage and cooking and also generates temperature set-point information for the thermal sources as a function of time according to internal programs and time sources which are complemented by external inputs such as keyboard, cards, or tapes. The set-point information is transmitted at appropriate times to controller 61 which also receives information such as temperature from appliances and thermal sources. The controller then provides power for the operating assemblies to attain set-point levels. General computer and controller structures and functions are well known and their more detailed application to the present appliance is described.

The computer monitors inside and outside temperatures from sensors 62C and 62D to determine appropriate operation of the auxiliary heat sinks. When outside temperatures are warm, for example, the outside radiator would be selected to cool hot thermal exchange fluid and the inside radiator selected to warm cold thermal exchange fluid. At off-peak hours, temperature information from hot reservoir sensor 62A and from cold reservoir 62B is compared to set-point levels from the computer by the controller which provides power to heater 33A and to heat pump 37 until temperature information from the sensors is sufficiently beyond phase transition points to assure complete charging of the thermal reservoirs. When the heat pump is operating, the controller provides power to open regulator valve 40 and to operate pump 13C to circulate thermal exchange fluid between cooling chamber 39 and sauce heat exchanger 12C.

The controller receives temperature information from appliance sensors 64A, 64B, and 64C which it compares to set-point levels received from the computer. As an example, a person prepares a roast for the next day's supper, places it in storage oven 20A, and and enters a processing program and completion time into the computer. For the first phase of refrigerated storage, the computer transmits a set-point of 40° F. to the controller. The controller then provides power to selector valves 21A, which connect the appliance heat exchanger across the cold supply and return mains, to pump 13B, and to regulator valve 23A so that cold thermal exchange fluid circulates to cool the storage oven. When the controller receives temperature information from sensor 64A that the set-point of 40° F. has been attained, it removes power from the regulator valve to stop flow of the cold thermal exchange fluid through the storage oven. The controller then repeats the process of modulating the regulator valve to maintain the storage oven at approximately 40° F. At a predetermined time, the computer transmits a cooking temperature set-point to the controller which first provides power to the selector valve to connect the appliance heat exchanger to the moderate temperature liquid thermal exchange fluid cicuit, then provides power to pump 13D to circulate cool thermal exchange fluid through the inside radiator, and then provides power to the selector valve to connect the appliance heat exchanger to the hot liquid thermal exchange fluid circuit. Power is provided by the controller to pumps 13A and 36 and to the regulator valve so that thermal exchange fluid circulates between the appliance and the source heat exchangers 22A and 12A to heat the storage oven. The controller modulates the regulator valve to maintain the set-point temperature, say 400° F., at sensor 64A. When the computer determines that the cooking period is completed, it transmits serving temperature set-point information to the controller of say 160° F. The controller then removes power from pumps 13A and 36, provides power to the selector valves to connect the appliance heat exchanger to the moderate temperature liquid thermal exchange fluid circuit, provides power to pump 13C to circulate thermal exchange fluid through the outside radiator, and modulates the regulator valve to attain the set-point temperature of 160° F. If the food is not removed at the intended time, the controller provides power to the selector valves and the hot liquid thermal exchange fluid circuit to return the appliance to a heating mode to maintain a serving temperature.

In a pressure cooking appliance using the system of the invention, not shown but described in cited copending application Ser. No. 941,123, the range of temperatures is complemented by other food processing environments which include rate of heating and cooling and selection of partial pressures of air and steam to control temperature and pressure independently. It is known that cooking or rapid cooling at pressures above atmospheric both retard loss of food moisture to improve food quality. Rapid cooling at low pressure can result in useful explosive effects such as releasing fish or poultry meat from bones. Pressure related processing environments are regulated by the controller in response to pressure information from a sensor by providing to water input, vapor drain, and air input valves in addition to the temperature control means described previously. The pressure cooking appliance can proceed through a complex program of temperature and pressure environments to provide improvements in domestic cooking, yet its marginal cost is moderate since it shares thermal sources and other system components with all other appliances.

The liquid thermal exchange fluid circuits may be derived from conventional components. The small scale of a domestic appliance system allows economical use of hermetic mechanical seals such as bellows or canned enclosures. An expansion vessel with a bellows seal, not shown, to accommodate thermal expansion of the thermal exchange fluid is located on the low pressure side of pump 13A. Pumps may be of the centrifugal type regulated in response to a pressure differential sensor, not shown, connected to the supply and return mains. Selector valves are preferably solenoid operated spool type. Generally, $2^n$ inputs can be accommodated where n is the number of solenoids. Accordingly, two solenoids are sufficient for the two selector valves and three circuits associated with each appliance such as the storage oven, One solenoid is sufficient to select flow from the two inputs of the range or freezer. Regulator valves are preferably solenoid operated pulse modulated spool valves. To tolerate rapid temperature changes, valves are fabricated of materials having low coefficients of thermal expansion such as graphite, glass or ceramoplastic bonded mica, or pyrex. Supply and return mains, connecting conduits, and heat exchangers are mild carbon steel with welded or brazed joints.

The liquid thermal exchange fluid is a stable liquid at the temperature extremes of the hot and cold reservoirs. It is selected from fluids having high heat transfer efficiency, thermal stability to resist formation of gases, polymers, or carbon scale, low toxicity, and negligible corrosive effects. Preferred fluids include aromatic hydrocarbons such as "Therminol 60" manufactured by Monsanto which can be used between $-60°$ F. and $600°$ F. and "Dowtherm J" manufactured by Dow Chemical which can be used between $-100°$ F. and $575°$ F.

An apparent variation of the invention is use of additional liquid thermal exchange circuits with supply and return mains to which appliances can connect through selector valves. Such circuits are associated with thermal reservoirs having latent heat storing material with phase transition points at less extreme temperatures such as $200°$ F. and $35°$ F. Such less extreme temperatures allow use of heat pumps under conditions of improved energy efficiency.

I claim:

1. A system of appliances for exchanging heat between foods and latent heat storing materials by forced circulation of a liquid thermal exchange fluid comprising in combination
   - a plurality of appliances each in a heat exchange relationship with a food, each of the appliances having a single appliance heat exchanger to receive the liquid thermal exchange fluid,
   - a hot reservoir having a latent heat storing material of sufficient thermal capacity to release heat over a period of peak use to the thermal exchange fluid and having means to charge the latent heat storing material,
   - a cold reservoir having a latent heat storing material to absorb heat over a period of peak use from the thermal exchange fluid and having means to charge the latent heat storing material,
   - a hot liquid thermal exchange fluid circuit connecting the appliances with the hot reservoir, said hot circuit including the appliance heat exchangers, a hot supply main and a hot return main, a pump and a hot reservoir heat exchanger joining the hot supply main and the hot return main, said pump developing a pressure differential between the hot supply main and the hot return main,
   - a cold liquid thermal exchange fluid circuit connecting the appliances with the cold reservoir, said cold circuit including the appliance heat exchangers, a cold supply main and a cold return main, a pump and a cold reservoir heat exchanger joining the cold supply main and the cold return main, said pump developing a differential pressure between the cold supply main and the cold return main,
   - selector valves connecting the appliance heat exchangers either between the hot supply main and the hot return main or between the cold supply main and the cold return main, and
   - regulator valves to regulate flow of the thermal exchange fluid through the appliance heat exchangers between the supply main and the return main selected by the selector valves to regulate appliance temperature and thereby using forced circulation of the liquid thermal exchange fluid in the hot circuit and the cold circuit to exchange heat between the foods and the latent heat storing materials through the appliance heat exchangers and the reservoir heat exchangers.

2. The system of claim 1 which further includes
   - at least one auxiliary heat sink having a heat sink heat exchanger to moderate temperature of the thermal exchange fluid,
   - an auxiliary heat sink liquid thermal exchange fluid circuit connecting the appliances with the auxiliary heat sink including the appliance heat exchangers, a moderate temperature supply main and return main, a pump and a heat sink heat exchanger joining the moderate temperature supply and return main, said pump developing a differential pressure between the moderate temperature supply and return main, and
   - selector valves to selectively connect the appliances only to like pairs of supply and return mains.

3. The system of claim 2 which further includes a plurality of auxiliary heat sinks,
   - said auxiliary heat sinks joining the moderate temperature supply and return mains, each said auxiliary heat sink having an auxiliary heat sink heat exchanger,
   - means to develop a differential pressure across the moderate temperature supply and return mains to force the thermal exchange fluid to flow through the auxiliary heat sink heat exchangers, and
   - means to control flow of thermal exchange fluid through selected auxiliary heat sinks to preclude reverse flow through auxiliary heat sink heat exchangers not selected to function.

4. The system of claim 2 wherein said auxiliary heat sink comprises an outside radiator in contact with outside air which exchanges heat between the thermal exchange fluid and the ambient outside air.

5. The system of claim 1 wherein the heat storing material in the hot reservoir has a phase transition temperature sufficiently high to provide cooking temperatures in the appliances which have cooking functions.

6. The system of claim 5 wherein said phase transition temperature exceeds $300°$ F.

7. The system of claim 6 wherein said phase transition temperature is substantially $550°$ F.

* * * * *

UNITED STATES PATENT AND TRADEMARK OFFICE
CERTIFICATE OF CORRECTION

PATENT NO. : 4,173,993

DATED : November 13, 1979

INVENTOR(S) : Stephen F. Skala

It is certified that error appears in the above-identified patent and that said Letters Patent are hereby corrected as shown below:

In Related U.S. Application Data, delete "299,274" and insert --299,214--.
Column 1, line 6, delete "299,274" and insert --299,214--.
Column 3, line 55, correct "applicances" to --appliances--.
Column 8, line 22, correct "exchanger" to --exchange--.
Column 9, line 66, delete "and".

Signed and Sealed this

Ninth Day of June 1981

[SEAL]

Attest:

RENE D. TEGTMEYER

*Attesting Officer*   *Acting Commissioner of Patents and Trademarks*